Figure 3:
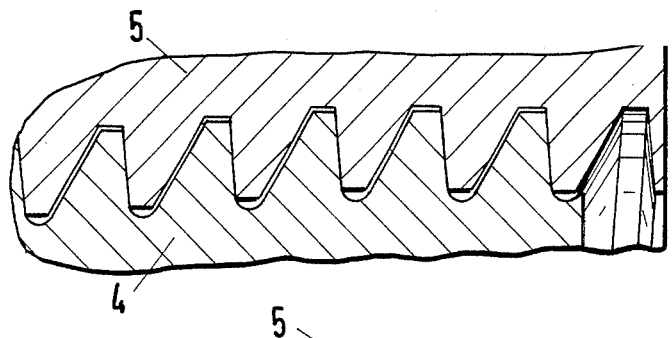

United States Patent [19]

Weinhold

[11] Patent Number: 4,802,695
[45] Date of Patent: Feb. 7, 1989

[54] PIPE SCREWED CONNECTION

[76] Inventor: Karl Weinhold, Im Jagdfeld 43, 4040 Neuss 1, Fed. Rep. of Germany

[21] Appl. No.: 50,327

[22] Filed: May 18, 1987

[30] Foreign Application Priority Data

May 21, 1986 [DE] Fed. Rep. of Germany ....... 3617014
Mar. 25, 1987 [DE] Fed. Rep. of Germany ....... 3709819

[51] Int. Cl.⁴ .................................................. F16L 19/00
[52] U.S. Cl. ........................................ 285/91; 285/175; 285/332.3; 285/354
[58] Field of Search ............. 285/354, 91, 386, 332.3, 285/175

[56] References Cited

U.S. PATENT DOCUMENTS

| | | | |
|---|---|---|---|
| 904,673 | 11/1908 | Bideker | 285/354 X |
| 982,537 | 1/1911 | Schuler . | |
| 1,562,675 | 11/1925 | Baker | 285/40 |
| 1,973,848 | 9/1934 | Duffy | 285/333 |
| 2,880,019 | 3/1959 | Wurtz et al. | 285/91 X |
| 2,971,782 | 2/1961 | Sparkman et al. | 285/354 X |
| 3,357,723 | 12/1967 | Dumont et al. | 285/91 X |
| 3,822,902 | 7/1974 | Mauerer et al. | 285/94 |
| 3,994,516 | 11/1976 | Fredd | 285/175 X |
| 4,165,106 | 8/1979 | Gladden | 285/354 X |
| 4,209,193 | 6/1980 | Ahlstone | 285/354 X |
| 4,324,423 | 4/1982 | Pitesky | 285/354 |
| 4,659,116 | 4/1987 | Cameron | 285/354 X |

FOREIGN PATENT DOCUMENTS

| | | | |
|---|---|---|---|
| 846491 | 8/1952 | Fed. Rep. of Germany . | |
| 1028510 | 4/1958 | Fed. Rep. of Germany . | |
| 2517050 | 6/1975 | Fed. Rep. of Germany . | |
| 2603566 | 5/1976 | Fed. Rep. of Germany . | |
| 818250 | 8/1959 | United Kingdom | 285/354 |
| 984947 | 3/1965 | United Kingdom | 285/354 |

*Primary Examiner*—Thomas F. Callaghan
*Attorney, Agent, or Firm*—Kerkam, Stowell, Kondracki & Clarke

[57] ABSTRACT

The invention relates to a pipe screwed connection having a socket member attachable to one pipe end, a plug-in member at the opposite pipe end which can be partly inserted into the socket member, and a union nut for which the plug-in member has a bearing surface in the form of an annular shoulder and which engages over the plug-in member and is screwed on to the socket member. The characterizing feature of the invention is that the meshing screwthreaded surfaces of the union nut and the socket member are matchingly conical in construction.

9 Claims, 3 Drawing Sheets

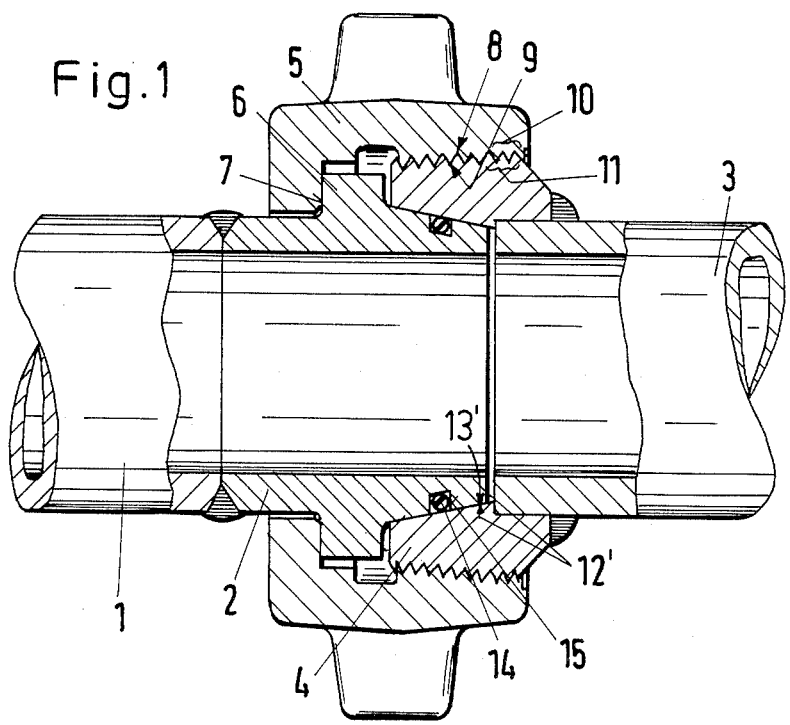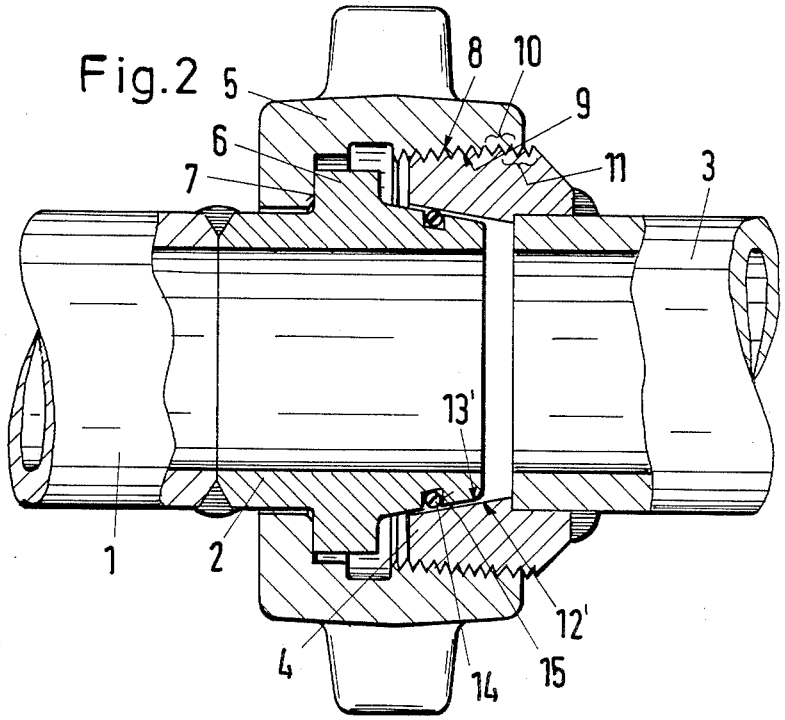

PIPE SCREWED CONNECTION

The invention relates to a screwed connection, more particularly for pipes used under high pressure or accoutrements inserted in piping, having a socket member attachable to one pipe end, a plug-in member at the opposite pipe end which can be partly inserted into the socket member, and a union nut for which the plug-in member has a bearing surface in the form of an annular shoulder and which engages over the plug-in member and is screwed on to the socket member.

Following prolonged use and/or as a result of a dirt-charged or aggressive atmosphere, such commercially available pipe screwed connections become so clogged by corrosion and/or dirt that some of the screwthreaded connections can be released only with permanent damage, if at all. This applies more particularly to pipe screwed connections underground, which are normally constructed with a cylindrical, round screwthreading. Such a screwthreaded connection should be readily releasable due to the partially merely linear contact at the flanks of the round screwthreading, but under severe conditions of use even cylindrical, round screwthreaded connections can no longer be released.

It is an object of the invention to obviate this disadvantage and provide a pipe screwed connection, more particularly a high pressure screwed connection which will withstand even severe operational loadings, such as a heavy accumulation of dirt and an aggressive atmosphere, in unfavourable conditions of use, for example, under ground and can be readily released at any time.

To solve this problem with the kind of pipe screwed connection according to the invention, the meshing screwthreaded surfaces of the union nut and the socket member are matchingly conical in construction. The screwthreaded external peripheral surface of the socket member tapers in the direction of its free end, while the screwthreaded internal peripheral surface of the union nut widens conically to match in the outward direction. The depth of screwthreading therefore remains constant over the length of the particular screwthreading portion.

The advantage of the pipe screwed connection having conical screwthreaded surfaces according to the invention in comparison with the prior art cylindrical screwthreaded connections used is that the engagement of the screwthreading can be released after even less than one rotation. As a result it is very easy to release even pipe screwed connections with a heavily corroded or dirtied screwthreading.

To improve guidance, in a preferred embodiment of the pipe screwed connection according to the invention the union nut and the socket member each have adjoining their conical screwthreaded surfaces a short cylindrical screwthreaded portion having few turns. When the union nut is slid on to the socket member, the screwthreaded connection is first made via the short cylindrical screwthreaded portion, whereafter the conical screwthreaded portions are pulled into one another as the union nut continues to be turned.

The connection between the plug-in member and the socket member via the union nut is self-centering. To this end preferably the sealing surfaces of the plug-in member and the socket member are cylindrical or matchingly conical in construction. Preferably a sealing ring is inserted to an annular groove in at least one of the two sealing surfaces, to seal off the pipe screwed connection.

Since the pipe screwed connection according to the invention can be readily released, buttress or trapezoidal screwthreadings can now be conveniently used, in which the supporting surfaces under tensile stressing are appreciably larger than in the case of a round screwthreading with which, as already stated, there is partially only linear contact.

Embodiments of the invention illustrated in the drawings will now be explained in greater detail.

Figure 4:
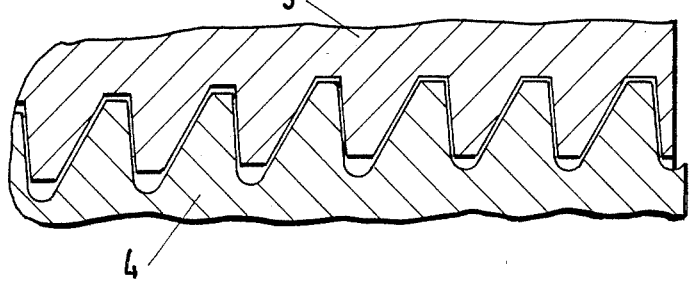
Figure 5:
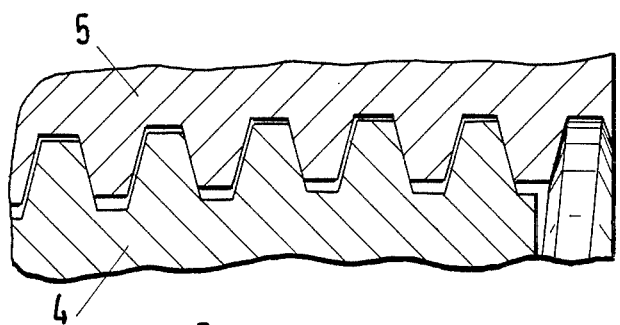
Figure 6:
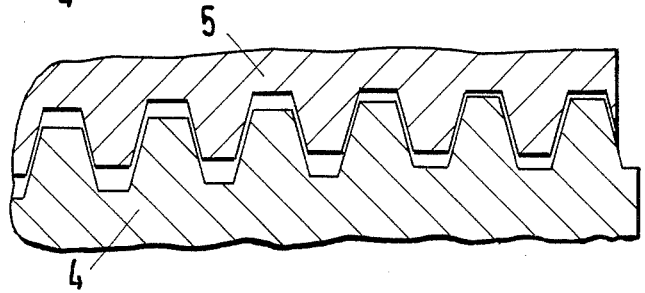
Figure 7:
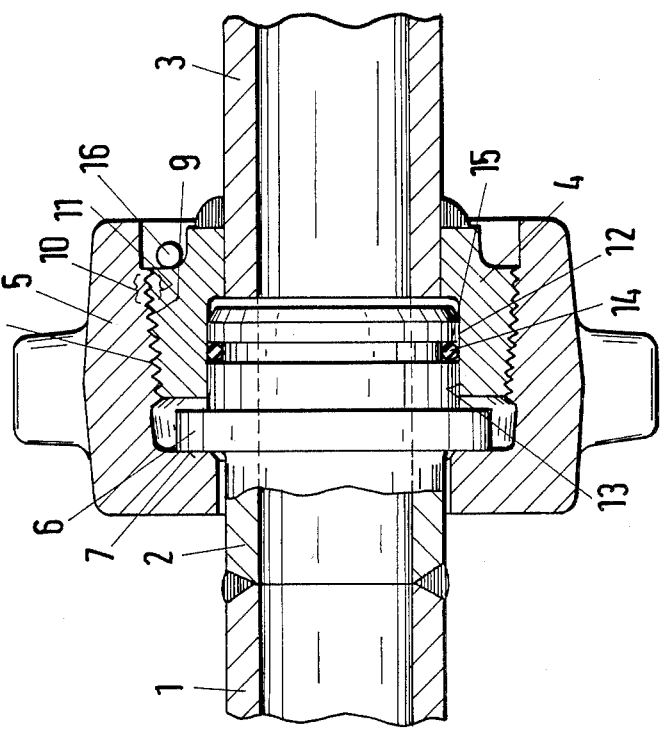
Figure 8:
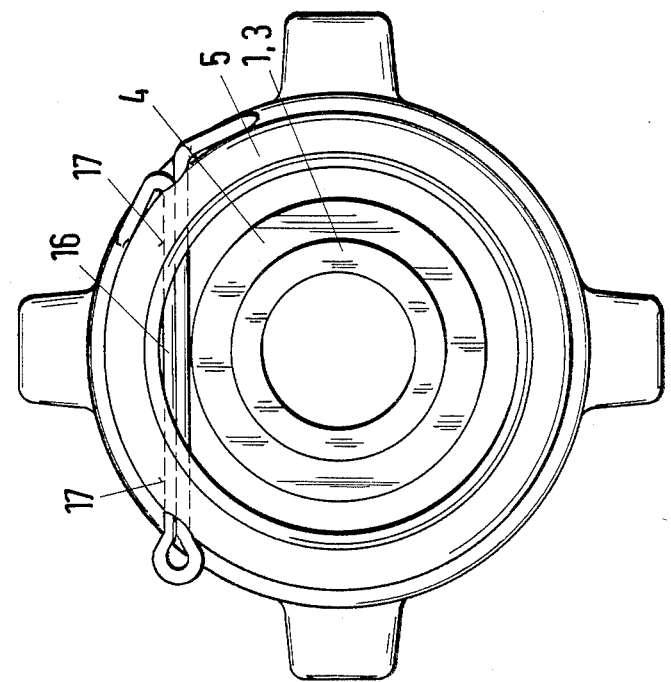

In the drawings:

FIG. 1 is a longitudinal section through the pipe screwed connection with the union nut firmly screwed on, FIG. 2 is the same section as FIG. 1, but with the screwed connection loosened, FIG. 3 is a section to an enlarged scale of the engagement of buttress screwthreading in the tightened condition, FIG. 4 is the same section as FIG. 3, with the buttress screwthreading loosened, FIG. 5 is a section to an enlarged scale of the engagement between the union nut and the socket member with trapezoidal screwthreading in the tightened condition, FIG. 6 is the same section as FIG. 5, but with the screwthreading loosened, FIG. 7 is a longitudinal section through a variant embodiment of the pipe screwed connection, and FIG. 8 is an elevation of the pipe screwed connection shown in FIG. 7.

In the drawings like elements have like references. Referring to FIGS. 1 and 2, a plug-in mmber 2 is welded to the end of one pipe 1, an associated socket member 4 being welded to the end of an opposite pipe 3. A union nut 5 is applied over the plug-in member 2. An annular collar 6 on the plug-in member 2 forms a bearing surface in the form of an annular shoulder 7 for the union nut 5, which engages over the plug-in member 2 and is screwed on to the socket member 4.

The meshing screwthreaded surfaces 8 on the union nut 5 and 9 on the socket member 4 are conical in construction. The screwthreaded surface 8 of the union nut 5 widens conically outwards, while the screwthreaded surface 9 of the socket member 4 tapers conically in the direction of its free end. This means that the conicities of the meshing surfaces 8, 9 of the union nut 5 and socket member 4 match one another.

For centering at the start of tightening the union nut 5 on to the socket member 4, the screwthreaded surface 8 of the nut 5 and also the screwthreaded surface 9 of the socket member 4 each have a short cylindrical screwthreading portion 10; 11. The union nut 5 first meshes fully with the socket member 4 over these screwthreading portions. As the union nut 5 is turned further, the threads on the conical surfaces 8, 9 then also mesh, until finally the union nut 5 can be no longer turned and the final position shown in FIG. 1 is reached.

When the union nut 5 is screwed onto the socket member 4, the nut entrains the plug-in member 2 and draws it into the socket member 4 (FIG. 2), until the conical sealing surface 13' at the end of the plug-in member 2 contacts the matching conical sealing surface 12' of the socket member 4. In the embodiment shown in FIG. 7 the sealing surfaces 12, 13 are cylindrical.

Inserted into an annular groove 15 in the plug-in member 2 is a sealing ring 14 which seals the gap between the plug-in member 2 and the socket member 4 when the sealing surfaces 12, 13; 12', 13' are in engagement.

Preferably the socket member 4 and the union nut 5 have a buttress (FIGS. 3 and 4) or trapezoidal screwthreading (FIGS. 5 and 6). FIGS. 3 and 5 show the relative position of the screwthreading teeth with the union nut 5 fully screwed on to the socket member 4, while FIGS. 4 and 6 show the relative position of the screwthreadings with the screwed connection somewhat more released.

For permanent connection (FIGS. 7 and 8) a split locking pin 16 can be inserted through a transverse bore 17 in the union nut, the bore being so situated that the pin 16 engages behind the socket member 4, as shown most clearly in FIG. 7.

I claim:

1. A liquid-tight, hydraulic, pipe screwed connection having a socket member attachable to one pipe end, a plug-in member at the opposite pipe end which can be partly inserted into the socket member, and a union nut for which the plug-in member has a bearing surface in the form of an annular shoulder and which engages over the plug-in member and is screwed on to the socket member, wherein meshing screwthreaded surfaces disposed on the union nut and on the socket member each have matchingly conical threads and cylindrical threads, said cylindrical threads intersecting said conical threads at the largest diameter of said conical threads, and said cylindrical threads being substantially fewer in number than said conical threads, whereby the angle of conicity of said conical threads is such that rotating the union nut disengages the threads of each threaded member readily by virtue of a gap which is produced between the conical threads when the threaded members are shifted longitudinally in relation to each other, and wherein opposite coaxial sealing surfaces of each of the plug-in member and the socket member are cylindrical, and a sealing ring is inserted in an annular groove in at least one of said plug-in member and said socket member sealing surfaces and wherein a split locking pin is inserted transversely through the union nut and engages a locking pin shoulder surface in said socket member.

2. The liquid-tight, hydraulic, pipe screwed connection according to claim 1, wherein the union nut and the socket member have a buttress screwthreading or a trapezoidal screwthreading.

3. A liquid tight, hydraulic pipe screwed connection having a socket member attachable to one pipe end, a plug-in member at the opposite pipe end which can be partly inserted into the socket member, and a union nut for which the plug-in member has a bearing surface in the form of an annular shoulder and which engages over the plug-in member and is screwed on to the socket member, wherein meshing screwthreaded surfaces disposed on the unionnut and on the socket member each have matchingly conical threads and cylindrical threads, said cylindrical threads intersecting said conical threads at the largest diameter of said conical threads and said cylindrical threads being substantially fewer in number than said conical threads, whereby the angle of conicity of said conical threads is such that rotating the union nut disengages the threads of each threaded member readily by virtue of a gap which is produced between the conical threads when the threaded members are shifted longitudinally in relation to each other, and wherein the surface of the plug-in member and the sealing surface of the socket member are matchingly conical in construction and a sealing ring is inserted in an annular groove in at least one of the two sealing surfaces and wherein a split locking pin is inserted transversely through the union nut and engages a locking pin shoulder surface in said socket member.

4. A liquid-tight, quick release connection for connecting two pipe ends comprising:
(a) a first pipe end on a first pipe having a socket member attached to said first pipe end, said socket member having a sealing surface and a meshing screwthreaded surface with a cylindrical portion and a conical portion;
(b) a second pipe end on a second pipe having a plug-in member partially insertable into said socket member, said plug-in member having a sealing surface and an annular shoulder with a bearing surface; and
(c) a union nut substantially surrounding said second pipe end and engaging said plug-in member bearing surface so as to retain said union nut disposed around said second pipe, said union nut having a meshing screwthreaded surface with a cylindrical portion and a conical portion screwable onto said socket member, said meshing, screwthreaded surfaces of said socket member and said union nut being complementary, said conical portion being substantially greater in length than said cylindrical portion, said screw threaded cylindrical portion intersecting said screw threaded conical portion at the largest diameter of said screw threaded conical portion, whereby said meshing, screwthreaded surfaces mesh together and cause said sealing surfaces to abut each other and to form a liquid-tight seal when said union is screwed fully onto said socket member, and whereby the angle of conicity of the conical portion is large enough so that turning the union nut disengages the threads of each threaded member readily by virtue of a gap which is produced between the respective conical portions of the union nut and of the socket member when they are shifted longitudinally in relation to each other.

5. The liquid-tight, quick release connection according to claim 4 wherein said socket member sealing surface is frusto-conical about an axis substantially parallel to the longitudinal dimension of said first pipe and said plug-in member sealing surface is frusto-conical about an axis substantially parallel to the longitudinal dimension of said second pipe, whereby said socket member sealing surface and said socket member screwthreaded surface define an annular shaped portion that is compressed toward said plug-in member as said union nut is fully screwed onto said socket member.

6. The liquid-tight, quick release connection according to claim 4 wherein said plug-in member includes an annular depression accommodating a sealing ring whereby said sealing ring ensures the sealing of the liquid-tight seal when said union nut is screwed fully onto said socket member by pressing against said socket plug-in member sealing surface.

7. The liquid-tight, quick release connection according to claim 6 wherein said union nut further includes a transverse bore for accommodating a locking pin whereby said locking pin engages a locking pin shoulder surface in said socket member so as to prevent loosening of said union nut.

8. The liquid-tight, quick release connection according to claim 4 wherein the meshed, screwthreaded surface of each of the socket member and the union nut include screwthreads having a buttressed shape.

9. The liquid-tight, quick release connection according to claim 4 wherein the meshed, screwthreaded surface of each of the socket member and the union nut include screwthreads having a trapezoidal shape.

* * * * *

UNITED STATES PATENT AND TRADEMARK OFFICE
CERTIFICATE OF CORRECTION

PATENT NO. : 4,802,695

DATED : February 7, 1989

INVENTOR(S) : Weinhold

It is certified that error appears in the above-identified patent and that said Letters Patent is hereby corrected as shown below:

Col. 31, claim 3, line 57 "unionnut" should be --union nut--.

Col. 4, claim 6, line 62 delete [plug-in].

Signed and Sealed this

Sixth Day of March, 1990

Attest:

JEFFREY M. SAMUELS

Attesting Officer

Acting Commissioner of Patents and Trademarks